United States Patent Office 3,524,827
Patented Aug. 18, 1970

3,524,827
METHOD FOR COMBINING A POLY-ALKYLENIMINE WITH A STARCH
Donald L. Johnson and Allen C. Kryger, Decatur, Ill., assignors to A. E. Staley Manufacturing Company, Decatur, Ill., a corporation of Delaware
No Drawing. Filed Nov. 24, 1967, Ser. No. 685,267
Int. Cl. C08b 25/00
U.S. Cl. 260—9
8 Claims

ABSTRACT OF THE DISCLOSURE

A process for combining a polyalkylenimine with starch by adding an aqueous solution of a polyalkylenimine maintained at a particuler pH to a starch slurry which is maintained at a different but particular pH. The product obtained has utility as an adhesive in paper coating compositions.

This invention relates to a method for combining a polyalkylenimine with starch and particularly to a method for combining polyethylenimine with a carboxylated starch which is suspended or slurried in water.

It has been reported by R. W. Kerr in die Starke, vol. 4, page 257 (October 1952), that polyethylenimine (PEI) can be adsorbed so strongly by dry starch that it is not washed out completely by alcohol but is by acidified HCl)-methanol. However, it has been found, through extensive laboratory studies, that PEI is not as readily adsorbed on starch while the starch is slurried or suspended in water. Since most starch conversions and process plants are presently adapted for handling, transporting and processing of starch slurries, it would be advantageous if such starch slurries, rather than a dry granular starch, could be used for quantitatively combining a polyalkylenimine with starch. For example, only minor modifications would be required for converting or establishing already existing units into a unit capable of combining a polyalkylenimine with starch. Another advantage in utilizing a starch slurry rathre than a dry granular starch for combining a polyalkylenimine with starch is that a more uniform product is possible by the addition of PEI to an aqueous starch slurry rather than by the addition of PEI to dry granular starch. Attempts to combine PEI with starch in a starch slurry have been, for the most part, unsatisfactory. It was found that substantial amounts of the PEI remained in the water and were not being adsorbed on the starch material. Since a high concentration of low molecular weight PEI is known to be toxic, this could create a serious problem of filtrate disposal. Present attempts to remove, and if possible, to recover the PEI from the filtrate have either been too costly or not completely effective.

It is, therefore, an object of this invention to provide a substantially quantitative method for combining a polyalkylenimine with a starch in an aqueous starch slurry.

Another object of this invention is to provide a substantially quantitative method for combining a polyethylenimine with a carboxylated starch by adding the polyethylenimine to an aqueous starch slurry or suspension.

Other objects will be apparent from the disclosure and examples to follow.

These and other objects of this invention are accomplished by the addition of a polyalkylenimine to an aqueous starch slurry under carefully controlled pH conditions.

One particularly important aspect of this invention is that the polyalkylenimine can be substantially quantitatively combined with starch if a solution of a polyalkylenimine is maintained, during addition to a starch slurry, within a particular pH range while at the same time maintaining the starch slurry within a different but equally critical pH range. Within practical limits the polyalkylenimine is added to a starch slurry which is maintained at a pH of less than 6.0 and preferably at a pH value of between 4.0 and 4.9. This latter preferred range being used primarily when the starch is a modified starch containing carboxyl groups. The polyalkylenimine, on the other hand, is added as an aqueous solution which is maintained at a pH value of greater than 8.0 and preferably at a pH value of between 9.0 and 9.8, particularly when the polyalkylenimine is is polyethylenimine.

It was found that when an aqueous polyalkylenimine solution such as polyethylenimine (PEI) is combined with a starch slurry within the above pH ranges, substantially all of the PEI is combined with the starch material. However, if the pH of the starch slurry is greater than 6.0, even though the pH of the PEI solution is maintained between 9.0 and 9.8, or if the pH of the PEI solution is below 8.0 while the pH of the starch slurry is at a pH between 4.0 and 4.9, the amount of PEI remaining in solution and recovered in the filtrate when the starch is filtered will range from 15 to 50% and sometimes even higher. If the starch slurry is maintained at a pH of, for example, between 4.0 and 4.9 during the addition of a PEI solution having a pH value of between 9.0 and 9.8, less than 1% of the PEI will be recovered in the filtrate. Therefore, by adding the PEI solution to the starch slurry within carefully controlled pH ranges very little, if any, of the PEI is transmitted into the disposal system.

The starch materials which can be used in the process of this invention may be any type of starch capable of combining with PEI. These include either the cereal, root or tuber, or stem starches and derivatives thereof. For example, starch material derived from corn, rice, wheat, tapioca, sago, sorghum, potato, and the like, and the individual fractions of such starches including amylose and amylopectin, can be used. Dextrins and the waxy and the high amylose starches can also be used. Certain of the substituted or derivatized starches, and particularly the "anionic starches" such as the oxidized starches, are preferred. The oxidized starches, and particularly those which contain carboxyl groups, are still further preferred. Dicarboxylated starches, i.e. dialdehyde starches which have further been oxidized, may also be used to advantage.

Generally, the oxidized starches will contain carboxyl groups in an amount of between about 0.1 to 10% based on the weight of the starch material and preferably will contain carboxyl groups of from about 0.1 to 5% by weight of starch.

The oxidized starches may be obtained by numerous oxidation methods well known in the art. For example, the oxidation of starch may be accomplished by the use of hydrogen peroxide, hypohalites, periodic acid, potassium persulfate, and many others. A more complete discussion on methods for oxidizing starches can be found in Chemistry and Industry of Starch, second edition, 1950, pages 325–343, by R. W. Kerr.

The polyalkylenimine added to the starch slurry is a water-soluble cationic polyelectrolyte formed by the self-polymerization of an alkylenimine. For example, polyethylenimine is formed by the polymerization of ethylenimine having the structural formula:

The polymerized product (PEI) has been identified as having the following structural formula:

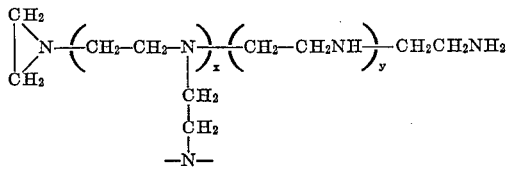

wherein $x$ and $y$ are numbers ranging from 1 to 1,000 and possibly even higher. Analysis of the PEI has shown a ratio of primary to secondary to tertiary nitrogens to be approximately 1-to-2-to-1, respectively. It has been reported that the PEI can have a molecular weight ranging from about 200 to 100,000.

In additional to polyethylenimine, other polyalkylamines such as polypropylenimine, polybutylenimine, etc. can also be combined with starch by the process of this invention.

For purposes of demonstrating this invention, a starch slurry was prepared by adding granular oxidized starch (oxidized with hypochlorite) to water with stirring to obtain a slurry or suspension of starch in water. Although the amount of starch in water is not particularly critical, an amount of between about 10 to about 50% starch based on the total weight of the starch slurry and preferably between about 30 to 40% starch by weight starch is generally used.

Before the PEI solution is added to the starch slurry, the starch slurry is adjusted to the desired pH (e.g. 4.0–4.9) by the addition of either an acid or an alkaline material. The PEI solution is generally added to the starch solution as an aqueous solution; however, other solvents, or mixtures of solvents, such as water and alcohol, can be used if desired. Although the PEI can be added to the starch slurry as a concentrated or relatively dilute solution, a more uniform adsorption of PEI on starch is obtained when PEI solution contains from between about 20% and 30% of PEI. Higher or lower concentrations, however, can be used if desired.

The rate at which the PEI can be combined with the starch can be increased by cooking the starch-PEI mixture at an elevated temperature. The cooking time of the mixture can vary from about 10 minutes to about 10 hours depending on the cooking temperature. The cooking temperature is not particularly critical and can be varied from between 27° C. and 60° C. Generally though, as the cooking temperature is increased, the cooking time is decreased. Preferably, cooking temperatures of between 35° C. and 46° C. are used and have been found to be highly satisfactory.

Although from an engineering or processing standpoint, it is more desirable to add the polyalkylenimine to the starch slurry, the addition may be reversed and the starch slurry can be added to the polyalkylenimine solution if desired.

The starch products produced by the process of this invention have a variety of uses and have particular utility as an adhesive in formulating paper coating compositions, for use in sizing or coating papers or textiles. Such a use is described in detail in patent application Ser. No. 685,328, filed on the same date as the instant application in the name of Kelley G. Taylor and assigned to the assignee of the instant application.

The following examples are given for the purpose of illustration only and are not to be interpreted as specific limitations of this invention.

EXAMPLE 1

A starch slurry was prepared by adding 100 grams of oxidized starch having 1.04% carboxyl groups, d.S.b., in 0.181 liter of water. The oxidized starch was obtained by oxidizing pearl starch at a pH of 9.6 with 4.1 titer hypochlorite bleach. The starch slurry was adjusted to a pH of 4.4 by the addition of 0.47 ml. of 34% hydrochloric acid solution. 1.5% gm. of PEI was added to the starch slurry as a 25% solution of PEI in water adjusted to a pH of 9.1 with HCl. The PEI had an average molecular weight of about 1800. The mixture of PEI and starch was cooked at a temperature of 38° C. for 10 minutes. The PEI-starch product was then filtered and washed with 0.180 liter of water. The total filtrate was collected and analyzed for its PEI content. It was found that less than 0.2% of the PEI introduced into the starch slurry was present in the filtrate.

EXAMPLES 2–10

Example 1 was repeated with the variation that the pH of the starch slurry and the PEI solution was varied as shown in Table I below.

The amount of PEI combined with the starch at the various pH values is reported in the last column.

These examples clearly show that if the PEI is to be quantitatively combined with the starch, the pH values for both the starch slurry and PEI solutions should preferably be maintained within relatively narrow pH ranges.

TABLE I

| Examples | pH Values | | Percent PEI combined with starch |
|---|---|---|---|
| | Starch slurry | PEI solution | |
| 2 | 2.0 | 7.1 | 25.0 |
| 3 | 4.5 | 7.1 | 51.0 |
| 4 | 7.0 | 7.1 | 65.0 |
| 5 | 2.0 | 9.1 | 54.0 |
| 6 | 4.5 | 9.1 | 99.7 |
| 7 | 7.0 | 9.1 | 79.0 |
| 8 | 2.0 | 11.1 | 72.0 |
| 9 | 4.5 | 11.1 | 80.0 |
| 10 | 7.0 | 11.1 | 20.0 |

When the above examples are repeated with other polyalkylenimines, such as propylenimine, butylenimine and the like, essentially the same results are obtained.

EXAMPLES 11–13

These examples indicate that the carboxyl content of the starch material has little, if any, influence on determining the optimum pH range of the PEI solution and the starch slurry. In each of the examples the pH of the starch slurry was maintained at 4.4–4.6 while the pH of the PEI solution was maintained at 9.1–9.3. In each example 100 gm. of carboxylated starch, differing only in their carboxyl content, were used. The procedure described in Example 1 was repeated except for the variations shown in Table II.

TABLE II

| Examples | Percent COOH[1] | PEI gms. added [2] | Percent PEI combined with starch |
|---|---|---|---|
| 11 | 0.48 | 0.5 | 99.0 |
| 12 | 0.88 | 0.5 | 99.3 |
| 13 | 1.27 | 0.5 | 99.7 |

[1] pH of starch slurry 4.4-4.6.
[2] pH of PEI solution 9.1-9.3.

EXAMPLES 14–22

Although Examples 11–13 indicated that the carboxyl content had little, if any, effect on the pH conditions necessary for optimum operation, the following examples show that the amount of PEI capable of being combined with starch is directly related to the number of carboxyl groups present on the modified starch. These examples, in effect, show that the amount of PEI which can be quantitatively combined with starch increases as the carboxyl content of the starch is increased.

In each of the examples, the pH of the starch slurry was maintained at 4.4–4.6 while the pH of the PEI solution was maintained at 9.1–9.3. One hundred grams of starch were used in each instance. Except for the modifications reported above and in Table III, the procedure described in Example 1 was followed.

TABLE III

| Examples | Percent COOH | Gms. PEI | Percent PEI combined with starch |
|---|---|---|---|
| 14 | 0.48 | 0.5 | 99.0 |
| 15 | 0.48 | 1.0 | 96.0 |
| 16 | 1.27 | 1.0 | 99.7 |
| 17 | 0.45 | 1.5 | 85.5 |
| 18 | 1.27 | 1.5 | 99.6 |
| 19 | 0.45 | 2.0 | 66.0 |
| 20 | 1.27 | 2.0 | 96.0 |
| 21 | 0.45 | 4.0 | 42.5 |
| 22 | 1.27 | 4.0 | 85.0 |

EXAMPLES 23–32

These examples show that it is the pH of the starch slurry and the pH of the PEI solution prior to addition and not the pH of the starch-PEI combination which controls the efficiency of formation of the starch-PEI combination. This was determined by adding a solution of PEI adjusted to various pH values (as shown in Table IV) to a starch slurry also adjusted to various pH values (as shown in Table IV). Immediately after all of the PEI had been added to the starch slurry the PEI-starch combination was adjusted to a pH of between 8.4 and 8.7 (this pH being the pH which resulted from the addition of a PEI solution having a pH of between 9.1–9.3 and a starch slurry having a pH of 4.4–4.6 in Example 1).

The PEI-starch mixture was then stirred for 20 minutes at 95° F. The mixture was then acidified to a pH of 6.5–6.7 and filtered. The amount of PEI in the filtrate was determined and the amount in the starch is reported in Table IV. Except as indicated below, the procedure and reaction conditions were the same as those reported for Example 1.

TABLE IV

| Examples | pH Starch slurry | pH PEI solution | pH Starch-PEI mixture | Mixture was adjusted to pH | Percent PEI combined |
|---|---|---|---|---|---|
| 23 | 4.4–4.6 | 9.1–9.3 | 8.4–8.7 | 8.4–8.7 | 99.9 |
| 24 | 4.5 | 7.1 | 5.8 | 8.4–8.7 | 50.0 |
| 25 | 4.5 | 10.6 | 9.9 | 8.4–8.7 | 88.0 |
| 26 | 9.0 | 6.0 | 6.2 | 8.4–8.7 | 55.0 |
| 27 | 4.5 | 4.5 | 4.5 | 8.4–8.7 | 35.0 |
| 28 | 2.0 | 6.0 | 2.7 | 8.4–8.7 | 30.0 |
| 29 | 10.6 | 4.5 | 11.2 | 8.4–8.7 | 30.0 |
| 30 | 7.0 | 6.0 | 6.1 | 8.4–8.7 | 58.0 |
| 31 | 10.0 | 2.0 | 6.0 | 8.4–8.7 | 40.0 |
| 32 | 7.0 | 2.0 | 4.5 | 8.4–8.7 | 59.0 |

Since many embodiments of this invention may be made and since many changes may be made in the embodiments described, the foregoing is interpreted as illustrative and our invention is defined by the claims defined hereafter.

We claim:
1. An improved method for combining a polyalkylenimine with a starch comprising combining an aqueous starch slurry of 10 to 50% by weight starch with an aqueous solution of polyalkylenimine, said starch slurry being at a pH of below 6.0, and said solution of polyalkylenimine being at a pH of greater than 8.0 during said combining.

2. The process of claim 1 wherein the polyaklylenimine is polyethylenimine.

3. The process of claim 2 wherein said starch slurry is at a pH of between 4.0 and 4.9, and said polyethylenimine solution is at a pH of between 9.0 and 9.8.

4. The process of claim 1 wherein the starch slurry comprises a granular anionic starch suspended in water.

5. The process of claim 1 wherein the starch slurry comprises a modified starch having a carboxyl content of at least 0.01% based on the weight of starch dry substance basis.

6. The process of claim 5 wherein the polyalkylenimine is a polyethylenimine in an amount of between 0.01 to 10 parts per 100 parts by weight of carboxylated starch.

7. The process of claim 6 wherein the polyethylenimine has a molecular weight of between 200 and 100,000.

8. The combined starch and polyalkylenimine obtained by the process of claim 5.

References Cited

UNITED STATES PATENTS 3,331,833  7/1967  Jarowenko _____ 260—233.3

OTHER REFERENCES

Kerr et al., Chemical Abstracts, vol. 47, col. 3593e (1953).

Wood et al., Journal of Organic Chemistry, vol. 27, pp. 2115 to 2122 (1962).

Kerr et al. Die Starke, "The Reaction of Starch With Ethylenimine," vol. 4, pp. 255–257, October 1952.

DONALD E. CZAJA, Primary Examiner

M. I. MARQUIS, Assistant Examiner

U.S. Cl. X.R.

106—212; 260—209, 233.3